Patented May 16, 1939

2,158,473

UNITED STATES PATENT OFFICE 2,158,473

ACID ANTHRAQUINONE DYESTUFFS AND THEIR MANUFACTURE

Carl Mettler, Basel, Switzerland, assignor to the firm of J. R. Geigy S. A., Basel, Switzerland No Drawing. Application March 3, 1938, Serial No. 193,803. In Switzerland March 11, 1937

10 Claims. (Cl. 260—374)

This invention relates to the production of anthraquinone dyestuffs, and has for its object to provide an improved process and product.

According to the invention valuable dyestuffs of the anthraquinone series are formed when a leuco-quinizarin or a mixture of a leuco-quinizarin and the quinizarin or other appropriate anthraquinone derivatives, containing in the 1,4-position exchangeable nuclear substituents, such as for example halogen or OCH₃, are condensed with amino diphenyl ethers and their homologues and the resulting dye bases of the general formula

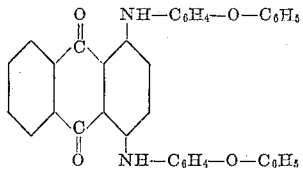

are sulphonated.

The dyeings obtained with the new dyestuffs on wool are fast against vigorous washing and fulling. They exhibit, especially when they have been dyed with sulphuric acid, a good potting fastness. At the same time they are also characterized by increased fastness to light and alkali and are very interesting owing to their blue-green tone which cannot be obtained with known dyestuffs of the same fastness properties.

Example 1

200 parts of 4-amino-diphenyl-ether, 40 parts of quinizarin, 30 parts of leuco-quinizarin and 30 parts of boric acid are heated whilst stirring to 130–150° C. until water vapour ceases to come off and the initial blue color of the mass no longer becomes more green.

After cooling the brittle mass is pulverized and the unchanged amino-diphenyl-ether is eliminated by boiling with dilute hydrochloric acid and recovered.

The dye base can be further purified by treatment with hot spirit.

It is obtained as a dark blue powder which dissolves in chlorobenzene with a vivid blue-green color and in concentrated sulphuric acid with a blue color.

For the purpose of sulphonation 4 parts of the dye base are introduced into 20 parts of concentrated sulphuric acid at 30° C. After stirring for 12 hours it is poured on ice. The separated sulphonic acid is sucked off, the dyestuff-acid dissolved alkaline in hot water with soda and the sodium-salt is precipitated by a little salt.

Dried and ground it constitutes a dark green powder which is dissolved easily with a blue-green color in water.

On wool there can be obtained acid blue-green, potting proof colors which are characterized by their fastness to light, alkali and sea water.

The temperature of the condensation may also be higher than 150° C., but the maximum of purity of the dyestuff is reached with temperatures of 130–150°, lower temperatures are practically not favorable due to the diminished reactivity.

Example 2

100 parts of o-aminophenyl-o-cresyl-ether, 48 parts of quinizarin, 12 parts of leuco-quinizarin and 120 parts of o-cresol are heated whilst stirring for 30 hours to 140–150° C.

After cooling a little acid is added and the o-cresol is driven off by steam. The remaining dye base separates in solid form. It is sucked off and dried.

It dissolves with difficulty in spirit, easily in chlorobenzene with a blue-green color, in concentrated sulphuric acid with a dark blue color.

When left standing with sulphuric acid, the base is converted into a sulphonic acid, of which the sodium salt is soluble with difficulty in cold water and can be separated from impurities by washing.

The dyestuff can be obtained as a dark green powder, which dissolves in concentrated sulphuric acid with a blue color, in hot water with a blue-green color. In order to dye wool it is advantageous to admix some tetrasodium pyrophosphate to the sodium salt of the dyestuff; there can be obtained potting proof dyeings of excellent general fastness properties.

Instead of the mixture of leuco-quinizarin and quinizarin equivalent parts of leuco-quinizarin alone may be used in the Examples 1 and 2.

Example 3

40 parts of o-aminophenyl-o-cresyl-ether, 5 parts of 1,4-dichloranthraquinone or equivalent parts of the bromo-compound, 4 parts of potassium acetate and 0.1 part of copper acetate are heated for 12 hours at 180–190° C. and after cooling have spirit added thereto. The dye base separates in a pure form. It is identical with the compound described in Example 2.

Instead of the above named amino-diphenylethers there may be used with similar results: o-aminodiphenylether, o-aminophenyl-m- or -p-cresylether, p-aminophenyl-o-, -m- or -p- cresylether, 2-amino-4-amyldiphenylether and other diphenylethers.

Instead of a leuco-quinizarin or a mixture thereof with quinizarin, the corresponding methylethers may also be used.

The sulphonation temperature is chosen lowest possible whereby the best purity of the dyestuff is obtained.

The sulphonated dyestuffs obtained are very probably the disulphonic acids of the dyestuff-bases, the properties being analogous to those of known anthraquinone-di-sulphonic acid dyestuffs.

What I claim is:

1. Process for the manufacture of acid-anthraquinone dyestuffs consisting in condensing a compound selected from the group consisting of anthraquinone and leuco-anthraquinone compounds containing in the positions 1 and 4 exchangeable nuclear substituents selected from the group of Cl, Br, OH and $OCH_3$ with an aminodiphenylether of the benzene series to the compounds of the general formula

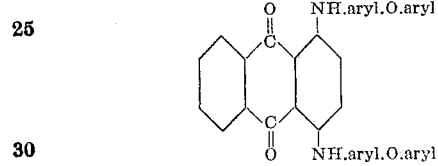

aryl meaning aryl radicals of the benzene series, sulphonating the dyestuff-base and neutralizing the obtained dyestuff acid.

2. Process for the manufacture of acid-anthraquinone dyestuffs consisting in condensing a mixture of leuco-quinizarin and quinizarin with an aminodiphenylether of the general formula

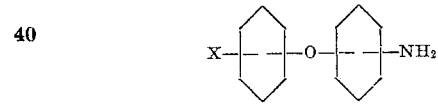

(X being a member of the group consisting of hydrogen and $CH_3$ and the oxygen atom and the primary amino group being in two of the positions ortho and para to each other) to the compounds of the general formula

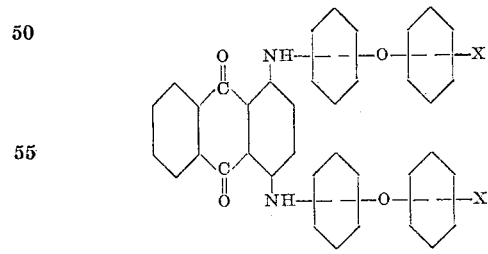

sulphonating the dyestuff-base and neutralizing the obtained dyestuff-acid.

3. Process for the manufacture of acid-anthraquinone dyestuffs consisting in condensing a mixture of leuco-quinizarin and quinizarin in the presence of boric acid at about 130–150° C. with 4-aminodiphenylether until the water vapour ceases to come off and the initial blue color of the mass no longer becomes more green, sulphonating with substantially 5 times as much of concentrated sulphuric acid at about 30° C. and neutralizing the separated dyestuff-sulphonic acid.

4. Process for the manufacture of acid-anthraquinone dyestuffs consisting in condensing a mixture of leuco-quinizarin and quinizarin in the presence of boric acid at about 130–150° C. with o-aminodiphenylether until the water vapour ceases to come off and the initial blue color of the mass no longer becomes more green, sulphonating with substantially 5 times as much of concentrated sulphuric acid at about 30° C. and neutralizing the separated dyestuff-sulphonic acid.

5. Process for the manufacture of acid-anthraquinone dyestuffs consisting in condensing a mixture of leuco-quinizarin and quinizarin in the presence of boric acid at about 130–150° C. with o-aminophenyl-o-cresylether until the water vapour ceases to come off and the initial blue color of the mass no longer becomes more green, sulphonating with substantially 5 times as much of concentrated sulphuric acid at about 30° C. and neutralizing the separated dyestuff-sulphonic acid.

6. As new products acid anthraquinone dyestuffs in the free state of the probable general formula

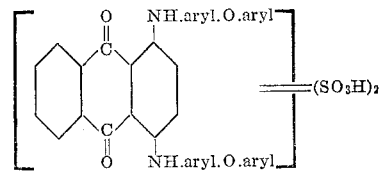

aryl meaning radicals of the benzene series, being dark green powders, soluble with a blue-green color in water and dyeing wool in an acid bath blue-green shades of very good fastness to potting, light, alkali and sea water.

7. As new products acid anthraquinone dyestuffs in the free state of the probable general formula

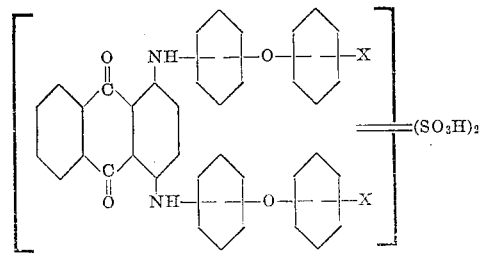

X being a member of the group consisting of hydrogen and $CH_3$ and the oxygen atom and the NH-group being in two of the positions ortho and para to each other, being dark green powders, soluble with a blue-green color in water and dyeing wool in an acid bath blue-green shades of very good fastness to potting, light, alkali and sea water.

8. As new product, the acid anthraquinone dyestuff, in the free state of the probable general formula

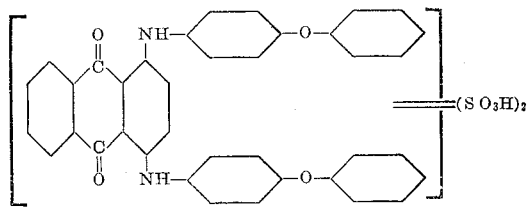

being a dark green powder, easily soluble with a blue-green color in water and dyeing wool in an acid bath blue-green shades of very good fastness to potting, light, alkali and sea water.

9. As new product, the acid anthraquinone dyestuff, in the free state of the probable general formula

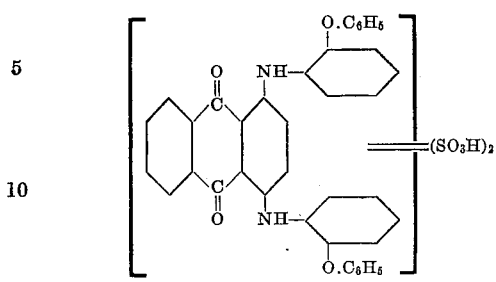

being a dark green powder, easily soluble with a blue-green color in water and dyeing wool in an acid bath blue-green shades of very good fastness to potting, light, alkali and sea water.

10. As new product, the acid anthraquinone dyestuff, in the free state of the probable general formula

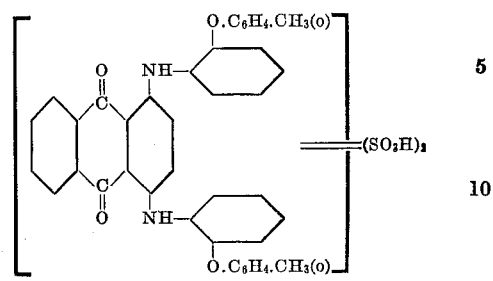

being a dark green powder, soluble with a blue-green color in water and dyeing wool in an acid bath blue-green shades of very good fastness to potting, light, alkali and sea water.

CARL METTLER.